Aug. 22, 1961      E. W. GRIMES      2,996,897
ATMOSPHERIC WATER SUPPLY APPARATUS
Filed Nov. 30, 1960      2 Sheets-Sheet 1
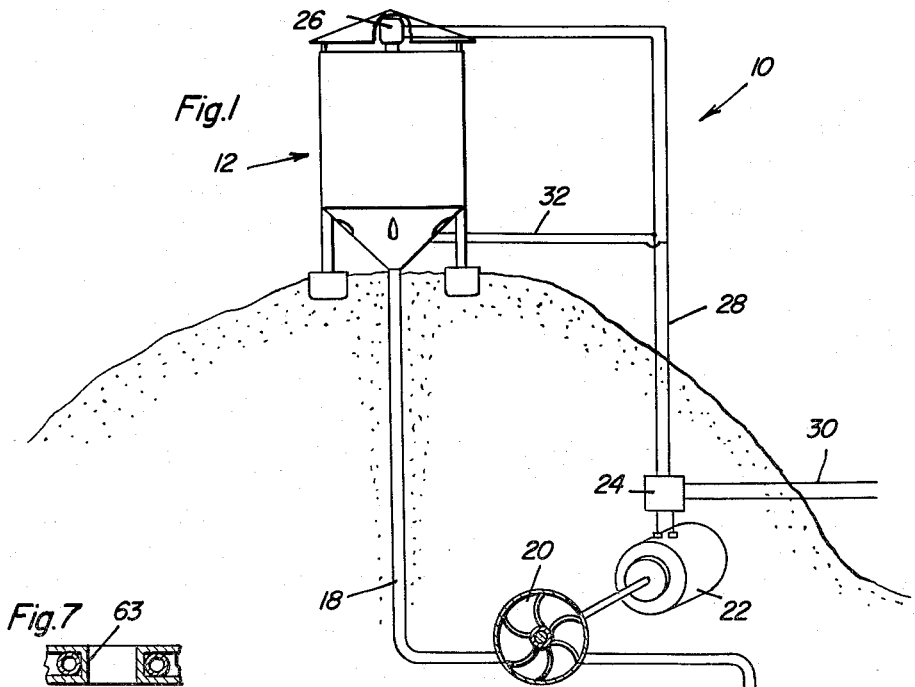
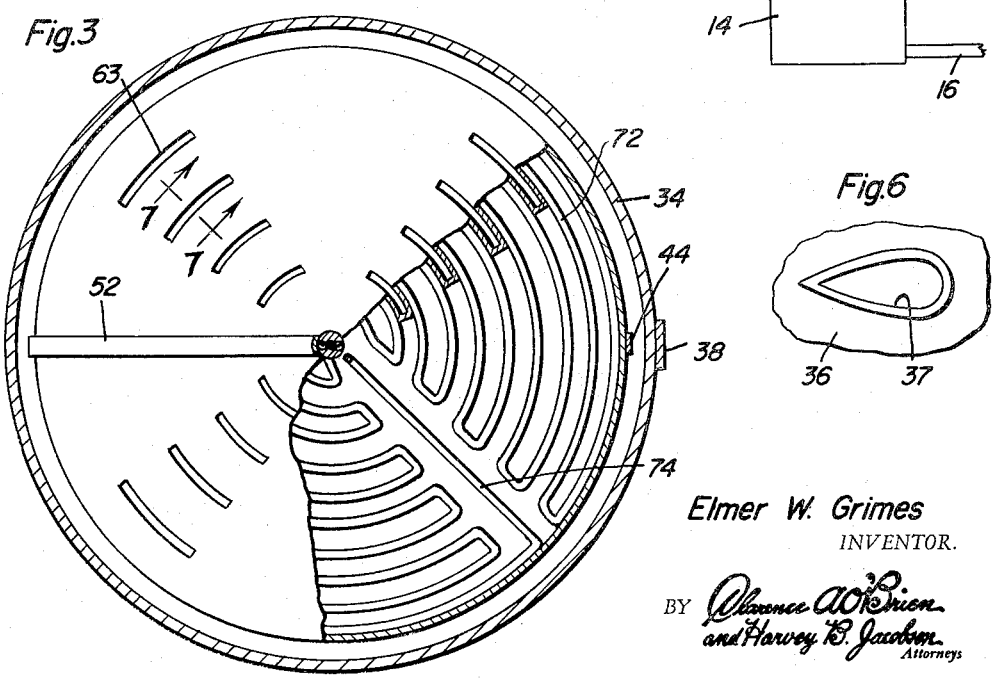
Elmer W. Grimes
INVENTOR.

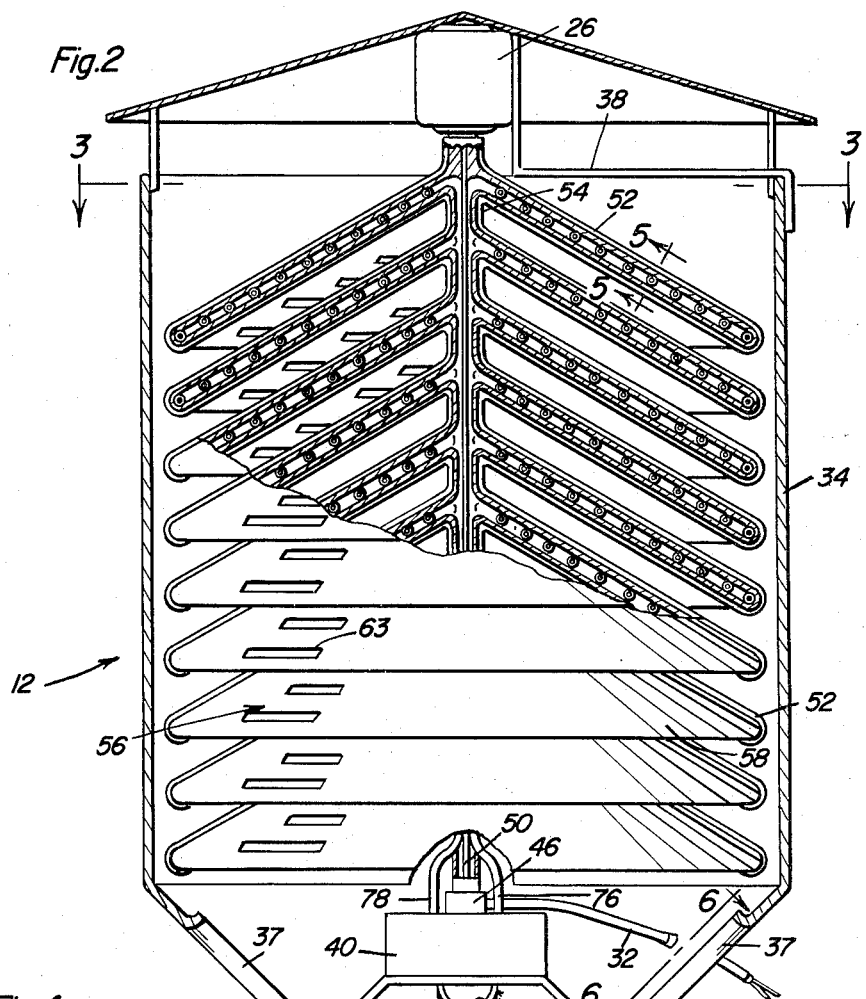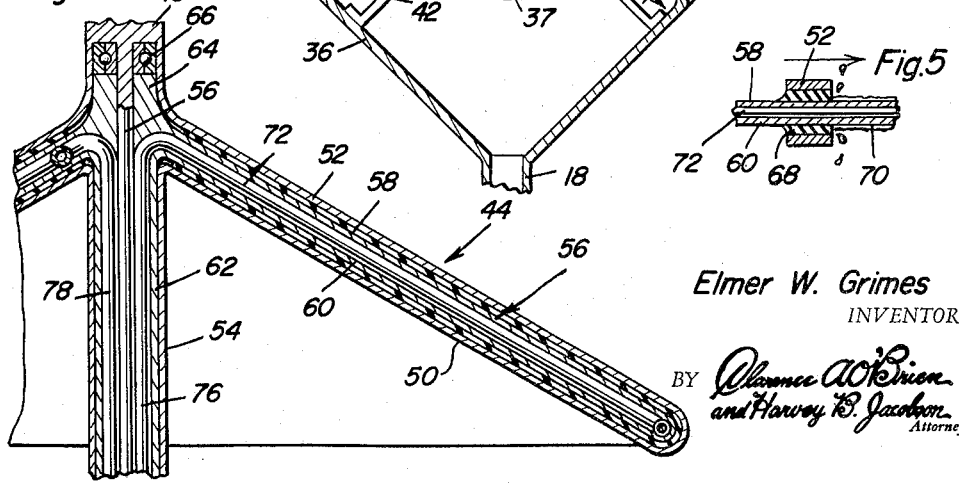

United States Patent Office 2,996,897
Patented Aug. 22, 1961

2,996,897
ATMOSPHERIC WATER SUPPLY APPARATUS
Elmer W. Grimes, 3875 Palos Verdes Drive N.,
Rolling Hills Estate, Calif.
Filed Nov. 30, 1960, Ser. No. 72,700
12 Claims. (Cl. 62—260)

This invention relates to a method and apparatus for obtaining a fresh water supply from the atmosphere.

In arid and semi-arid regions, the supply of fresh water is a considerable problem which has in the past been met by the use of highly expensive apparatus, equipment and systems involving transport of water over great distances by equipment which is consequently very vulnerable to destruction and additionally expensive in upkeep and repair. Other types of apparatus for obtaining fresh water supply in such regions involves the processing of sea water which has heretofore proven to be slow and also extremely expensive for obtaining water in larger practical quantities. It is therefore a primary object of this invention to provide apparatus which is especially useful in such arid and semi-arid regions for providing a fresh water supply in a more efficient, rapid and less costly manner than was heretofore possible.

Another object of this invention is to provide a source of fresh water to be obtained from the atmosphere in a manner similar to a portion of the natural water cycle and by a process which avoids the highly costly boiling, evaporating and pumping of sea water which characterize water supply systems as aforementioned.

A further object of this invention is to provide a water supply apparatus which removes the water from the atmosphere by condensation and precipitation thereof for use both in the home and for commercial purposes having the advantage of providing a more local source of water and also the providing of water which will be naturally soft having no scale to clog plumbing as characterizes the water transported over great distances nor any disposal problem with respect to salt and mineral matter as characterizes water supply systems deriving the water from sea water.

An additional object of this invention is to provide apparatus for obtaining a water supply directly from the atmosphere by condensing of the water vapor in the atmosphere on a plurality of conical condensing surfaces exposed to the air which may be cooled by the air temperature when said temperature is below the condensing temperature and automatically cooled by circulating refrigerant when necessary so as to provide means for continuously condensing on the condensing surfaces the water vapor in the air. Continuously operating mechanical wiper mechanism in contact with the condensing surfaces cause the condensation thereon to be precipitated and collected at a funnel bottom portion of the apparatus. The water so collected is then conducted to local storage or use while the kinetic energy of the water flowing from the apparatus may be converted by means of a turbine driven generator into useful energy which may be utilized to operate the motor driving the precipitating wipers as well as the compressor by means of which the refrigerant is circulated within the condensing surface members for maintaining them at a temperature below the condensing temperature.

It will therefore be apparent from the foregoing, that the apparatus and method of this invention has the advantage of providing a continuous supply of water which may be so engineered to supply water at all times in sufficient quantities and at the same time furnish the power for its own operation and even at times excess power which may be used for other purposes. The apparatus and method of this invention therefore takes advantage of the potential energy acquired by water undergoing the natural water cycle by prematurely condensing the water vapor in the atmosphere and mechanically precipitating it by mechanism acting in concert with and supplementing natural phenomena.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic illustration of the installation and operating principles of the method and apparatus of this invention.

FIGURE 2 is a partial sectional view with parts shown in section of the apparatus.

FIGURE 3 is a sectional view taken substantially through a plane indicated by section line 3—3 of FIGURE 2.

FIGURE 4 is a partial enlarged sectional view of a portion of the conical condensing plate member and wiper mechanism.

FIGURE 5 is a partial sectional view taken substantially through a plane indicated by section line 5—5 in FIGURE 2.

FIGURE 6 is a top plan view of an opening in the funnel portion of the apparatus as viewed from a plane indicated by section line 6—6 in FIGURE 2.

FIGURE 7 is a partial sectional view taken through a plane indicated by section line 7—7 in FIGURE 3.

Referring to the drawings in detail, FIGURE 1 illustrates the installational set-up of the apparatus of this invention. The apparatus is generally indicated by reference numeral 10 and as shown in FIGURE 1 includes a tank structure generally referred to by reference numeral 12 preferably mounted at a higher elevation with respect to the local vicinity to be supplied by the apparatus. The water supply originates in the tank structure 12 and is supplied to a storage reservoir 14 for subsequent use through water supply mains 16. The water from the tank 12 is conducted to the water supply reservoir 14 by means of a conduit system 18 within which a turbine mechanism schematically illustrated and referred to by reference numeral 20 is disposed. Accordingly, a portion of the kinetic energy of the water flowing within the conduit system 18 is absorbed by the turbine mechanism 20 for powering an electrical generator 22 from which a source of electrical energy may be derived.

It will be observed in FIGURE 1, that the output of the generator 22 is connected to a suitable voltage regulator mechanism 24 which in turn is operatively connected to an electric motor 26 associated with the tank mechanism 12 by power lines 28, the voltage regulator mechanism 24 also being connected to external power lines 30 by means of which the power output from the generator 22 when of sufficient magnitude will not only supply energy for energizing the motor 26 but also through power line 30 may supply power for other uses. On the other hand, the power line may be so interrelated with the general community power supply system so that when the power output of the generator 22 is insufficient for operatively energizing the motor 26, an external source of power through the power line 30 may supply power to the motor 26 for operation thereof. It will also be observed from FIGURE 1, that additional electrical connection 32 is provided between the power lines 28 supplied either by the generator 22 or the external power source connected thereto through the power lines 30 and voltage regulator 24 so as to automatically operate additional components of the equipment associated with the tank structure 12, as will hereafter be explained.

Referring now to FIGURES 2, 3, 4 and 5 in particular it will be observed that the tank structure 12 includes a cylindrical portion 34 which is connected at the bottom thereof to a funnel portion 36 to which the conduit 18 is connected. Water will accordingly be collected at the bottom of the funnel 46 and conducted by the conduit 18 for storage and use as hereinbefore indicated. Disposed on the funnel portion walls are a plurality of streamlined-shaped openings 37 with upwardly projecting rims enabling the circulation of moisture laden air through the funnel portion for additional water collection therefrom, said opening being designed however to prevent flow or less of water from the funnel portion as seen from FIGS. 2 and 6. It will also be observed that the motor 26 which is disposed above the open top of the cylindrical portion 34 of the tank structure 12 is mounted on the cylindrical portion 34 by means of suitable mounting structure 38 while a refrigerant circulating unit 40 is mounted within the funnel portion 36 in axial alignment with the motor 26 by any suitable supporting structure 42. In addition to the wiper of the unit 44 driven by the motor 26, the compressor mechanism 40 is also driven from the motor 26 and is drivingly connected thereto through a thermostatically controlled disconnector mechanism 46 of any suitable design utilizing the power from the power lines to perform its connect and disconnect function, the electrical connecting lines 32 being provided for such purposes. The specific designs for the mechanism 46 are well known to those skilled in the art and forms no part of the present invention.

It will be observed from FIGURES 2 and 4 in particular that the motor 26 has an output shaft 48 to which there is connected an elongated extension shaft 50 which extends downwardly through the tank 12 for connection to the compressor 40 through the thermostatically controlled electrically operated clutch mechanism 46. Also, connected to the motor shaft 48 are a plurality of interconnected wiper arms 52 of the wiper mechanism 44. It will be observed from FIGURES 2 and 4 that there are provided a plurality of parallel and downwardly inclined wiper arms 52 which are interconnected by axial connecting portions 54.

The wiper arms 52 are disposed about and rotate with respect to a plurality of conical-shaped parallel and vertically spaced plate members each of which is generally referred to by reference numeral 56.

It will be observed that each of the conical plate members includes an upper exposed condensing surface portion 58 and a lower condensing surface portion 50 interconnected at the radial outer ends thereof while at the radially inner ends thereof said surface portions are connected to the surface portions of vertically adjacent conical plate members 52 by axial connecting portions 62. As will be more clearly seen in FIGURE 4, the plate members terminate at the top thereof in an axial portion 64 with respect to which the motor shaft 48 is rotatable, bearing 66 being disposed between the motor shaft 48 and the portion 64 of the conical plate member construction. Lined arcuate openings 63 are disposed in the condensing surface portions 58 and 60 of the conical plate members 56 in order to accommodate the circulation of air through and between the plate members shown in FIGURES 3 and 7. The plate members may be held fixed with respect to the housing tank 12 while the wiper arms 52 of the wiper mechanism 44 may be rotated relative thereto. Accordingly, the wiper arm 52 includes wiper material 68 which contacts the upper and lower surfaces 58 and 60 of each of the conical plate members 56 so as to wipe therefrom the condensation 70 formed thereon as more clearly seen in FIGURE 5. As a result thereof, precipitation of the condensation on the condensing surfaces is stimulated and/or effected. It will therefore be appreciated that the water so precipitated will fall downwardly from the conical surfaces 58 and 60 traversed by the wiper arm 52 and collected at the bottom of the funnel portion 36 of the tank 12.

From the foregoing it will be appreciated that the water vapor in the air to which the condensing surfaces 58 and 60 are exposed will condense on said surfaces if the temperature of the air is low enough or below the condensing temperature. It will further be appreciated that at certain times, such as for example at night, the air temperature will be such that the condensing surface will be at the proper temperature. However, at other times it will be necessary to artificially cool the condensing surfaces by use of a conventional circulating refrigerant system. Accordingly, circulating refrigerant coils 72 are disposed within each conical plate member 56 for such purpose. As more clearly seen in FIGURE 3 the coils 72 are so arranged as to provide cooling for the entire exposed surface of the conical condensing plate member 56 between the upper and lower condensing surfaces 58 and 60 of each conical plate member as more clearly seen in FIGURE 4 with the lined openings 63 being disposed between the coils. Each cooling coil network 72 is connected by a radially disposed connecting tube 74 as seen in FIGURE 3 which is connected to an axial tube portion 76 as seen in FIGURE 4 whereby refrigerant may be pumped into the coil 72 of each of the conical plate members 56. The axial portion 76 of the cooling tube is connected at the bottom thereof to the circulating unit 40. Refrigerant is accordingly supplied under pressure to the supply tube 76 for circulation through each of the conical plate members 56 and returned through a parallel axial tube 78 as seen in FIGURES 2 and 4. It will also be understood that although the apparatus is described in the illustrated example with the conical condensing plate members 56 being held stationary or fixed to the tank structure 12 and the wiper arms 52 rotated with respect thereto, this invention also contemplates the holding of the wiper arms stationary and rotating the conical plate members 56 with respect thereto if so desired. In connection the latter mentioned arrangement, mere rotational movement of the conical plate members may provide sufficient physical disturbance for the condensed water droplets by virtue of inertia and centrifugal forces to cause precipitation in which case the wipers will not be needed. Furthermore, the number of wiper arms cooperating with each of the conical plate members and the number of vertically stacked conical plate members may vary as desired and will depend upon the conditions under which the apparatus operates and the quantity of water to be derived from the atmosphere.

It will therefore be apparent to those skilled in the art, how the foregoing apparatus operates and functions. The economy of operation of the present apparatus will therefore be appreciated inasmuch as the wiper mechanism 44 which is operated by means of the electric motor 26 to which the compressor 40 is also connected, may for the most part receive its energization from the generator 22 which in turn derives its power from the kinetic energy of the water flowing through the conductor 18. Also, the unit 40 which in addition to the wiper mechanism 44 loads the motor 26 may have its load disconnected from the motor 26 for more efficient operation thereof when the cooling function of the refrigerant is no longer necessary as for example at night when the temperature of the air is at a low value. Removing the compressor load may be optionally effected manually or automatically by the mechanism 46 schematically shown which may be electrically operated to disconnect the motor driveshaft extension 50 from the compressor of the unit 40 when the air temperature is low.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for obtaining a supply of water from the atmosphere comprising water vapor condensing surface means exposed to the air, precipitating means operatively connected to said condensing surface means, motive power means operatively connected to said precipitating means for causing movement thereof to stimulate precipitation of the condensation formed on the surface means, water supply collecting means disposed below said surface means for receiving water precipitated from the surface means, water conducting means connected to the collecting means for conducting the water therefrom to storage or use, and power generator means operatively connected to said conducting means and motive power means and operative in response to flow of water through the conducting means to energize the motive power means for continuously effecting precipitation of the condensation.

2. The combination of claim 1, including cooling means operatively connected to the surface means for maintaining the surface means at a temperature below the vapor condensing temperature.

3. The combination of claim 2, wherein said cooling means includes circulating refrigerant means disposed within said surface means and compressor means operatively connected to said refrigerant means and drivingly connected to said motive power means for rendering the refrigerant means operative to cool the surface means.

4. The combination of claim 3, including means operatively connected to the compressor means to render the refrigerant means ineffective when the air temperature is reduced below a predetermined value.

5. The combination of claim 4, wherein said condensing surface means comprises a plurality of conical plate members mounted in parallel vertically spaced relation to each other.

6. The combination of claim 5, wherein said precipitating means includes wiper means in contact with each of said plate members, one of said wiper means and condensing surface means being rotated relative to the other of said means by the motive power means.

7. The combination of claim 6, wherein said collecting means comprises a housing within which the surface means and wiper means are mounted in exposed relation to the atmosphere, said housing having a funnel portion disposed below the surface means for collecting water therein and having moist air circulation means therein, said conducting means being connected to the funnel portion.

8. Apparatus for obtaining a supply of water from the atmosphere comprising water vapor condensing surface means exposed to the air, precipitating means operatively connected to said condensing surface means, motive power means operatively connected to said precipitating means for causing movement thereof to stimulate precipitation of the condensation formed on the surface means, water supply collecting means disposed below said surface means for receiving water precipitated from the surface means, water conducting means connected to the collecting means for conducting the water therefrom to storage or use, and cooling means operatively connected to the surface means for maintaining the surface means at a temperature below the vapor condensing temperature.

9. The combination of claim 8, wherein said cooling means includes circulating refrigerant means disposed within said surface means and compressor means operatively connected to said refrigerant means and drivingly connected to said motive power means for rendering the refrigerant means operative to cool the surface means.

10. Apparatus for obtaining a supply of water from the atmosphere comprising water vapor condensing surface means exposed to the air, precipitating means operatively connected to said condensing surface means, motive power means operatively connected to said precipitating means for causing movement thereof to stimulate precipitation of the condensation formed on the surface means, water supply collecting means disposed below said surface means for receiving water precipitated from the surface means, water conducting means connected to the collecting means for conducting the water therefrom to storage or use, said condensing surface means including a plurality of conical plate members mounted in parallel vertically spaced relation to each other having air circulating opening means disposed therein.

11. The combination of claim 10, wherein said precipitating means comprises a plurality of interconnected wiper arm members in contact with each of said plate members, one of said plurality of members being rotated relative to the other of said plurality of members by the motive power means.

12. The combination of claim 11, wherein said collecting means comprises a housing within which the surface means and wiper means are mounted in exposed relation to the atmosphere, said housing having a funnel portion disposed below the surface means for collecting water therein, said conducting means being connected to the funnel portion.

References Cited in the file of this patent
UNITED STATES PATENTS

| | | |
|---|---|---|
| 2,446,498 | Underwood | Aug. 3, 1948 |
| 2,761,292 | Coanda | Sept. 4, 1956 |
| 2,805,560 | Beresford | Sept. 10, 1957 |